US006997259B2

(12) United States Patent (10) Patent No.: US 6,997,259 B2
Nguyen (45) Date of Patent: Feb. 14, 2006

(54) METHODS FOR FORMING A PERMEABLE AND STABLE MASS IN A SUBTERRANEAN FORMATION

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 216 days.

(21) Appl. No.: 10/655,883

(22) Filed: Sep. 5, 2003

(65) Prior Publication Data

US 2005/0051330 A1 Mar. 10, 2005

(51) Int. Cl.
*E21B 43/04* (2006.01)
*E21B 33/138* (2006.01)
(52) U.S. Cl. .................. 166/276; 166/295; 166/299; 166/300; 507/219; 507/220; 507/234; 507/903; 507/906; 523/131
(58) Field of Classification Search ............... 166/276, 166/295, 299, 300, 376; 507/219, 220, 234, 507/903, 906; 523/131
See application file for complete search history.

(56) References Cited

U.S. PATENT DOCUMENTS

| | | |
|---|---|---|
| 2,238,671 A | 4/1941 | Woodhouse |
| 2,703,316 A | 3/1955 | Palmer .................... 260/78.3 |
| 3,173,484 A | 3/1965 | Huitt et al. .............. 166/280.1 |
| 3,195,635 A | 7/1965 | Fast ........................ 166/280.1 |
| 3,272,650 A | 9/1966 | MacVittie ..................... 134/7 |
| 3,302,719 A | 2/1967 | Fischer .................... 166/280.2 |
| 3,364,995 A | 1/1968 | Atkins et al. ............ 166/280.1 |
| 3,366,178 A | 1/1968 | Malone et al. ........... 166/280.1 |
| 3,404,735 A | 10/1968 | Young et al. |
| 3,455,390 A | 7/1969 | Gallus ........................ 166/295 |
| 3,681,287 A | 8/1972 | Brown et al. .................. 260/67 |
| 3,784,585 A | 1/1974 | Schmitt et al. ............. 260/861 |
| 3,819,525 A | 6/1974 | Hattenbrun ................ 252/132 |
| 3,828,854 A | 8/1974 | Templeton et al. ......... 166/307 |
| 3,854,533 A | 12/1974 | Gurley et al. .............. 166/276 |
| 3,857,444 A | 12/1974 | Copeland ................... 166/276 |
| 3,868,998 A | 3/1975 | Lybarger et al. ........... 166/278 |
| 3,912,692 A | 10/1975 | Casey et al. ............... 260/78.3 |
| 3,948,672 A | 4/1976 | Harnsberger ................ 106/90 |
| 3,955,993 A | 5/1976 | Curtice ....................... 106/90 |
| 3,960,736 A | 6/1976 | Free et al. |
| 3,968,840 A | 7/1976 | Tate ........................ 166/280.1 |
| 3,998,744 A | 12/1976 | Arnold et al. .............. 507/269 |
| 4,068,718 A | 1/1978 | Cooke, Jr. et al. ....... 166/280.2 |
| 4,169,798 A | 10/1979 | DeMartino |
| 4,172,066 A | 10/1979 | Zweigle et al. ....... 260/29.6 TA |
| 4,291,766 A | 9/1981 | Davies et al. .............. 166/276 |
| 4,387,769 A | 6/1983 | Erbstoesser et al. ........ 166/295 |
| 4,460,052 A | 7/1984 | Gockel ........................ 175/72 |
| 4,470,915 A | 9/1984 | Conway |
| 4,498,995 A | 2/1985 | Gockel |
| 4,526,695 A | 7/1985 | Erbstoesser et al. |
| 4,694,905 A | 9/1987 | Armbruster ................. 166/280 |
| 4,715,967 A | 12/1987 | Bellis |
| 4,716,964 A | 1/1988 | Erbstoesser et al. ........ 166/284 |
| 4,785,884 A | 11/1988 | Armbruster ................. 166/280 |
| 4,797,262 A | 1/1989 | Dewitz ....................... 422/142 |
| 4,809,783 A | 3/1989 | Hollenbeck et al. ........ 166/307 |
| 4,817,721 A | 4/1989 | Pober ......................... 166/295 |
| 4,838,352 A | 6/1989 | Oberste-Padtberg et al. ..... 166/291 |
| 4,842,072 A | 6/1989 | Friedman et al. ........... 166/295 |
| 4,843,118 A | 6/1989 | Lai et al. .................... 524/555 |
| 4,848,467 A | 7/1989 | Cantu et al. ................ 166/281 |
| 4,886,354 A | 12/1989 | Welch et al. .................. 356/70 |
| 4,936,385 A * | 6/1990 | Weaver et al. .............. 166/288 |
| 4,957,165 A | 9/1990 | Cantu et al. ................ 166/295 |
| 4,961,466 A | 10/1990 | Himes et al. ............... 166/250 |
| 4,984,635 A | 1/1991 | Cullick et al. .............. 166/261 |
| 4,986,353 A | 1/1991 | Clark et al. ................. 166/279 |
| 4,986,354 A | 1/1991 | Cantu et al. ................ 166/279 |
| 4,986,355 A | 1/1991 | Casad et al. ................ 166/295 |
| 5,082,056 A | 1/1992 | Tackett, Jr. ................. 166/295 |
| 5,142,023 A | 8/1992 | Gruber et al. .............. 528/354 |
| 5,178,218 A | 1/1993 | Dees .......................... 166/281 |
| 5,216,050 A | 6/1993 | Sinclair ...................... 524/108 |
| 5,218,038 A | 6/1993 | Johnson et al. ............. 524/541 |
| 5,247,059 A | 9/1993 | Gruber et al. .............. 528/354 |
| 5,249,628 A | 10/1993 | Surjaatmadja ............... 166/305 |
| 5,295,542 A | 3/1994 | Cole et al. .................. 166/278 |

(Continued)

FOREIGN PATENT DOCUMENTS

EP 0 510 762 A2 4/1992

(Continued)

OTHER PUBLICATIONS

Y. Chiang et al.: "Hydrolysis Of Ortho Esters: Further Investigation Of The Factors Which Control The Rate-Determining Step," Engineering Information Inc., NY, NY, vol. 105, No. 23 (XP-002322842), Nov. 16, 1983.

(Continued)

*Primary Examiner*—George Suchfield
(74) *Attorney, Agent, or Firm*—Robert A. Kent; Baker Botts

(57) ABSTRACT

The present invention relates to increasing the permeability of a subterranean formation by forming a resinous mass having conductive channels through which fluids can be produced in the formation. Some embodiments of the present invention provide methods of creating a permeable resinous mass comprising the steps of selecting an interval along a well bore; providing a resin slurry comprising an acid curable resin, filler, and degradable material; placing the resin slurry into the selected interval; and, activating the acid curable resin using an activator wherein the activation causes the acid curable resin to substantially cure, the degradable material to substantially degrade, and forms the permeable resinous mass.

60 Claims, No Drawings

U.S. PATENT DOCUMENTS

| | | | |
|---|---|---|---|
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,536,807 A | 7/1996 | Gruber et al. | 528/354 |
| 5,547,023 A | 8/1996 | McDaniel et al. | 166/280 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A * | 3/1997 | Dobson et al. | 507/211 |
| 5,670,473 A | 9/1997 | Scepanski | 510/445 |
| 5,698,322 A | 12/1997 | Tsai et al. | 428/373 |
| 5,712,314 A | 1/1998 | Surles et al. | 521/41 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,948,734 A | 9/1999 | Sinclair et al. | 507/219 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,177,484 B1 | 1/2001 | Surles | 523/131 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,387,986 B1 | 5/2002 | Moradi-Araghi et al. | 523/211 |
| 6,390,195 B1 | 5/2002 | Nguyen et al. | 166/276 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,543,545 B1 * | 4/2003 | Chatterji et al. | 166/381 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,763,888 B1 | 7/2004 | Harris et al. | 166/305.1 |
| 6,887,834 B1 | 5/2005 | Nguyen et al. | 507/221 |
| 2001/0016562 A1 | 8/2001 | Muir et al. | 507/201 |
| 2002/0036088 A1 | 3/2002 | Todd | 166/300 |
| 2002/0048676 A1 | 4/2002 | McDaniel et al. | 428/404 |
| 2002/0070020 A1 | 6/2002 | Nguyen | 166/295 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0040713 A1 | 3/2004 | Nguyen et al. | 166/295 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0231845 A1 | 11/2004 | Cooke, Jr. | 166/279 |
| 2004/0261993 A1 | 12/2004 | Nguyen | 166/276 |
| 2004/0261995 A1 * | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0000731 A1 | 1/2005 | Nguyen et al. | 175/57 |
| 2005/0006095 A1 | 1/2005 | Justus et al. | 166/295 |
| 2005/0028976 A1 | 2/2005 | Nguyen | 166/276 |
| 2005/0034865 A1 | 2/2005 | Todd et al. | 166/304 |
| 2005/0045326 A1 | 3/2005 | Nguyen | 166/278 |
| 2005/0059558 A1 * | 3/2005 | Blauch et al. | 507/203 |

FOREIGN PATENT DOCUMENTS

| | | |
|---|---|---|
| EP | 0 879 935 A2 | 11/1998 |
| EP | 0 879 935 A3 | 10/1999 |
| EP | 1398640 A1 | 3/2004 |
| GB | 1292718 | 10/1972 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |
| WO | WO 05/021928 A2 | 3/2005 |

OTHER PUBLICATIONS

M. Ahmad, et al.: Ortho Ester Hydrolysis: Direct Evidence For A Three-Stage Reaction Mechanism, Engineering Information Inc., NY, NY, vol. 101, No. 10 (XP-002322843), May 9, 1979.

U.S. Appl. No. 10/650,101, filed Aug. 26, 2003, Todd et al.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

International Search Report, PCT/GB2004/002948, corresponding to U.S. Appl. No. 10/655,883, filed May 24, 2005.

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

\* cited by examiner

METHODS FOR FORMING A PERMEABLE AND STABLE MASS IN A SUBTERRANEAN FORMATION

FIELD OF THE INVENTION

The present invention provides methods for creating a permeable and stable mass. More particularly, the present invention relates to increasing the permeability of a subterranean formation by forming a resinous mass having conductive channels through which fluids can be produced in the formation.

DESCRIPTION OF THE PRIOR ART

To enhance the permeability of a formation, it is often desirable to create a stable mass having conductive channels through which fluids can flow within the formation. For example, a subterranean formation may be treated to increase its permeability by hydraulically fracturing the formation to create or enhance one or more cracks or "fractures." Such hydraulic fracturing is often accomplished by injecting a viscous fracturing fluid at a rate and pressure sufficient to cause the formation to break down and produce one or more fractures. The fracture or fractures may be horizontal or vertical, with the latter usually predominating, and with the tendency toward vertical fractures increasing with the depth of the formation being fractured. Proppant may then be deposited in the fracture to form a proppant pack once the hydraulic pressure is released. The proppant pack functions as a stable mass, inter alia, to hold the fracture open while maintaining conductive channels through which such produced fluids can flow upon completion of the fracturing treatment.

Another situation in which it is desirable to create a stable mass having conductive channels is in a sand control operation. Sand control operations are used to reduce the migration of unconsolidated formation particulates. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing.

Traditionally, operations that form stable, conductive masses, such as the fracturing and sand control operations described above, use viscous servicing fluids to deliver the particulates. Once those operations are complete, the servicing fluids must generally be removed from the well bore and/or the subterranean formation. To accomplish that goal, the viscous servicing fluid may be "broken," that is, its viscosity reduced to make it easier to displace the fluid from the well bore or formation. The recovery of such servicing fluids is time consuming and may result in less desirable production due to polymer residue that remains in the formation.

SUMMARY OF THE INVENTION

The present invention provides methods for creating a permeable and stable mass. More particularly, the present invention relates to increasing the permeability of a subterranean formation by forming a resinous mass having conductive channels through which fluids can be produced in the formation.

Some embodiments of the present invention provide methods of creating a permeable resinous mass comprising the steps of selecting an interval along a well bore; providing a resin slurry comprising an acid curable resin, filler, and degradable material; placing the resin slurry into the selected interval; and, activating the acid curable resin using an activator wherein the activation causes the acid curable resin to substantially cure, the degradable material to substantially degrade, and forms the permeable resinous mass.

Other embodiments of the present invention provide methods of producing hydrocarbons through a permeable resinous mass comprising the steps of selecting an interval along a well bore in a producing subterranean formation; providing a resin slurry comprising an acid curable resin, filler, and degradable material; placing the resin slurry into the selected interval; and, activating the acid curable resin using an activator wherein the activation causes the acid curable resin to substantially cure, the degradable material to substantially degrade, and forms the permeable resinous mass; producing hydrocarbons from the subterranean formation through the permeable resinous mass.

Other and further objects, features and advantages of the present invention will be readily apparent to those skilled in the art upon a reading of the description of preferred embodiments which follows.

DESCRIPTION OF PREFERRED EMBODIMENTS

The present invention provides methods for creating a permeable and stable mass. More particularly, the present invention relates to increasing the permeability of a subterranean formation by forming a resinous mass having conductive channels through which fluids can be produced in the formation.

In some embodiments of the present invention an acid curable resin slurry comprising acid curable resin, filler, and solid degradable material is placed in an isolated interval of a well bore and activated. The activation, inter alia, causes the resin to become substantially solid and causes the solid degradable material to become a liquid or gas; thus leaving behind a network of conductive channels in the remaining, substantially solid, mass of resin and filler.

One skilled in the art will be aware of numerous methods for isolating a zone of interest along a subterranean well bore. The isolated interval may be a section of the well bore, a section of the formation surrounding the well bore, or a combination of the two. In some embodiments of the present invention, the isolated interval is a section of producing formation that is to be fractured.

Acid curable resins suitable for use in the resin slurries of the present invention include, but are not limited to, furan-based resins, phenolic-based resins, and phenol/phenol formaldehyde/furfuryl alcohol resins. Generally, the resin component of the resin slurry will make up from about 3% to about 70% by weight of the total resin slurry.

Selection of a suitable resin may be affected by the temperature of the subterranean formation to which the fluid will be introduced. By way of example, for subterranean formations having a bottom hole static temperature ("BHST") ranging from about 60° F. to about 600° F., a furan-based resin may be preferred. For subterranean formations having a BHST ranging from about 200° F. to about 400° F. a phenolic-based resin may be suitable. For subterranean formations having a BHST of at least about 175° F., a phenol/phenol formaldehyde/furfuryl alcohol resin also may be suitable.

One acid curable resin suitable for use in the methods of the present invention is a furan-based resin. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to 2-butoxy ethanol, butyl lactate, butyl acetate, tetrahydrofurfuryl methacrylate, tetrahydrofurfuryl acrylate, esters of oxalic, maleic and succinic acids, furfuryl acetate, and combinations thereof.

Another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, 2-butoxy ethanol, and combinations thereof.

Yet another resin suitable for use in the methods of the present invention is a phenol/phenol formaldehyde/furfuryl alcohol resin comprising from about 5% to about 30% phenol, from about 40% to about 70% phenol formaldehyde, and from about 10 to about 40% furfuryl alcohol.

A silane coupling agent may be used with the resins of the present invention, inter alia, to act as a mediator to help bond the resin to the filler surface when the resin slurry is formed. Examples of silane coupling agents that can be used in the present invention include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. When used, the silane coupling agent is added in an amount capable of sufficiently bonding the resin to the filler material. In one embodiment of the present invention, the amount of silane coupling agent used ranges from about 0.1% to about 3% by weight of the resin in the resin slurry.

A surfactant also may be used with the resins of the present invention so long as the surfactant is compatible with chosen resin and the subterranean formation. Suitable surfactants include, but are not limited to, ethoxylated nonyl phenol phosphate esters, mixtures of one or more cationic surfactants, and one or more non-ionic surfactants and alkyl phosphonate surfactants. The surfactant or surfactants used may be included in an amount in the range of from about 2% to about 15% by weight of the resin.

Fillers suitable for use in the resin slurries of the present invention are those materials that are relatively inexpensive and that will not combust or degrade when the resin slurry is activated. Suitable such fillers include but are not limited to, sand, particulates such as proppant or gravel, ground walnut hulls, polymer particles, microspheres, glass particles, ceramic particles, silica particles, carbon black powder, rubber particles such as from ground tires, combinations thereof, and the like. The filler may be used to add relatively low-cost volume to the resin slurry. Generally, the resin component of the resin slurry will be a relatively expensive portion of the treatment of the present invention. By placing filler in the resin slurry, the total volume of the final slurry can be increased at a minimal expense. If the chosen filler has a high strength, its addition to the resin slurry also may improve the strength of the final cured mass. Generally, the filler component of the resin slurry will make up from about 5% to about 50% by weight of the total resin slurry.

Degradable materials suitable for use in the resin slurries of the present invention include, but are not limited to, degradable polymers, dehydrated salts, and mixtures of the two. Generally, the degradable material component of the resin slurry is included in the resin composition in an amount sufficient to create a substantial number of conductive channels through the resin mass. In some embodiments of the present invention, the degradable material component will make up from about 1% to about 50% by weight of the total resin slurry. The amount of the degradable material in the resin slurry should not be such that when degraded, an undesirably high percentage of voids are left in the resinous mass. Too many voids may render the mass potentially ineffective in providing a sand control means. One of ordinary skill in the art, with the benefit of this disclosure, will recognize an optimum concentration of degradable material that provides desirable enhanced permeability and sand control.

Polymers suitable for use as a degradable material of the present invention may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Examples of suitable degradable materials include, but are not limited to, substantially water insoluble esters such as ortho esters; poly(orthoesters); aliphatic polyesters; lactides, poly(lactides); glycolides; poly(glycolides); poly($\epsilon$-caprolactone); poly(hydroxybutyrates); anhydrides; poly (anhydrides); poly(amino acids); polysaccharides such as dextran or cellulose; chitins; chitosans; proteins; aliphatic polycarbonates; poly(ethylene oxides); polyphosphazenes; particulate solid anhydrous borate materials such as anhydrous sodium tetraborates (also known as anhydrous borax) and anydrous boric acid.

Blends of degradable materials also may be suitable. One example of a suitable blend of materials includes a blend of a poly(lactic acid) and an ortho ester. Other materials that undergo degradation and produce acid also may be suitable, if the products of the degradation do not undesirably interfere with either the subterranean treatment being performed or the subterranean formation.

The specific features of the degradable material may be modified to provide the resin mass with optimum permeability while maintaining its desirable functionality. For instance, the degradable material may be selected to have a size and shape to maintain a substantial uniformity within the mixture. The degradable materials may have any shape, including but not limited to particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the mass. In certain preferred embodiments, a degradable material having a rod-like particle shape is used to create interconnecting channel-like voids in the permeable cement mass. One of ordinary skill in the art with the benefit of this disclosure will recognize the specific degradable material and the preferred size and shape for a given application.

In choosing the appropriate degradable material, one should consider the degradation products that will result. Also, these degradation products should not adversely affect other operations or components. The conditions of the well, e.g., well bore temperature and environmental factors, must also be considered when choosing a degradable material. Generally, smaller molecule degradable materials are suitable for use in lower temperature application and larger molecule degradable materials are suitable for use in higher-temperature applications. It is within the ability of one skilled in the art, with the benefit of this disclosure, to select a suitable degradable material.

The resin slurry of the present invention may be simply placed in a well bore or may be placed in a well bore at a pressure sufficient to create and fill one or more fractures along the isolated interval. Once the resin slurry is placed into its desired location, it is activated. Activation of the resin may be initiated, inter alia, by the use of a gas generating charge that is comprised mainly of a slow burning and nondetonating propellant; such charges are well known in the art. In some embodiments of the present invention, the propellant may comprise a modified nitrocellulose or nitroamine or a composite such as a composite containing ammonium perchlorate and a rubberized binder. Any conventional ignition device such as an electrical igniter, a pressure actuated detonator, or any other suitable device may be used to ignite the charge. As the combustion of the charge progresses after ignition, the combustion gas catalyzes the acid curable resin as a result of the acid by-products, such as gaseous hydrogen chloride, that are produced during the combustion of the charge. The acidic by-product may result from the combustion process itself, as when perchlorates are used, or may be produced by the reaction of additional constituents admixed with the charge that activate during the combustion process, such as would result from heat degradation of an acid ester.

Some embodiments of the present invention, provide methods of creating permeable masses comprising the steps of isolating an interval along a well bore to create an isolated interval; placing a resin slurry comprising an acid curable resin, filler, and degradable material into that isolated interval; and then activating the acid curable resin using an activator. Activating the acid curable resin causes the acid curable resin to substantially cure, causes the degradable material to substantially degrade, and thus forms a substantially stable, permeable mass.

Other embodiments of the present invention provide methods of controlling sand in a subterranean formation comprising the steps of isolating an interval along a well bore to create an isolated interval; placing a resin slurry comprising an acid curable resin, filler, and degradable material into that isolated interval; and then activating the acid curable resin using an activator. Activating the acid curable resin causes the acid curable resin to substantially cure, causes the degradable material to substantially degrade, and thus forms a permeable mass capable of controlling the migration of particulates.

The ignition causes the resin to set and the degradable material to degrade and leave behind a series of interconnected channels capable of conducting fluids through the otherwise solid mass of resin and filler. Following ignition and once the resin has become substantially solid and the degradable material has substantially degraded, the substantially solid mass of resin and filler left behind in the well bore may be drilled or reamed out to return the well to production. Where the resin slurry composition of the present invention is used for sand control, an annulus of the mass of resin and filler may be left between the walls of the formation along the well bore and the interior opening of the well bore.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of creating a permeable resinous mass comprising the steps of:
   selecting an interval along a well bore;
   placing a resin slurry comprising an acid curable resin, filler, and degradable material into the selected interval; and
   activating the acid curable resin using an activator wherein the activation causes the acid curable resin to substantially cure and aids in degrading the degradable material.

2. The method of claim 1 wherein the acid curable resin in the resin slurry is selected from the group consisting of furan-based resins, phenolic-based resins, phenol/phenol formaldehyde/furfuryl alcohol resins, and combinations thereof.

3. The method of claim 2 wherein the furan-based resin is selected from the group consisting of furfuryl alcohol resins, mixtures of furfuryl alcohol resins and aldehydes, and mixtures of furan resins and phenolic resins.

4. The method of claim 3 wherein the furan-based resin further comprises a solvent wherein the solvent is 2-butoxy ethanol, butyl lactate, butyl acetate, tetrahydrofurfuryl methacrylate, tetrahydrofurfuryl acrylate, an ester of oxalic acid, an ester of maleic acid, an ester of succinic acid, furfuryl acetate, or combinations thereof.

5. The method of claim 2 wherein the phenolic-based resin is selected from the group consisting of terpolymers of phenol, phenolic formaldehyde resins, and mixtures of phenolic and furan resins.

6. The method of claim 5 wherein the phenolic-based resin further comprises a solvent wherein the solvent is butyl acetate, butyl lactate, furfuryl acetate, 2-butoxy ethanol, or combinations thereof.

7. The method of claim 2 wherein the phenol/phenol formaldehyde/furfuryl alcohol resin comprises from about 5% to about 30% phenol, from about 40% to about 70% phenol formaldehyde, and from about 10% to about 40% furfuryl alcohol.

8. The method of claim 1 wherein the resin slurry further comprises a silane coupling agent.

9. The method of claim 8 wherein the silane coupling agent is selected from the group consisting of N-2-(aminoethyl)-3-aminopropyltrimethoxysilane, 3-glycidoxypropyltrimethoxysilane, and n-beta-(aminoethyl)-gamma-aminopropyl trimethoxysilane.

10. The method of claim 8 wherein the silane coupling agent is present in the resin slurry in an amount ranging from about 0.1% to about 3% by weight of the resin in the resin slurry.

11. The method of claim 1 wherein the resin slurry further comprises a surfactant.

12. The method of claim 11 wherein the surfactant is present in the resin slurry in an amount ranging from about 2% to about 15% by weight of the resin in the resin slurry.

13. The method of claim 1 wherein the acid curable resin is present in the resin slurry in an amount ranging from about 3% to about 70% by weight of the resin slurry.

14. The method of claim 1 wherein the filler in the resin slurry is selected from the group consisting of sand, proppant, gravel, ground walnut hulls, polymer particles, microspheres, glass particles, ceramic particles, silica particles, carbon black powder, rubber particles, and combinations thereof.

15. The method of claim 1 wherein the filler is present in the resin slurry in an amount ranging from about 5% to about 50% by weight of the resin slurry.

16. The method of claim 1 wherein the degradable material in the resin slurry is selected from the group consisting of degradable polymers, dehydrated salts, and combinations thereof.

17. The method of claim 1 wherein the degradable material is selected from the group consisting of substantially water insoluble esters, ortho esters, poly(orthoesters), aliphatic polyesters, lactides, poly(lactides), glycolides, poly(glycolides), poly($\epsilon$-caprolactones), poly(hydroxybutyrates), anhydrides, poly(anhydrides), poly(amino acids), polysaccharides, dextran, cellulose, chitins, chitosans, proteins, aliphatic polycarbonates, poly(ethylene oxides), polyphosphazenes, particulate solid anhydrous borate materials, anhydrous sodium tetraborate, anhydrous boric acid, and combinations thereof.

18. The method of claim 1 wherein the degradable material is present in the resin slurry in an amount ranging from about 1% to about 50% by weight of the resin slurry.

19. The method of claim 1 wherein the activator comprises a gas generating charge that is comprised mainly of a slow burning and nondetonating propellant.

20. The method of claim 19 wherein the nondetonating propellant is selected from the group consisting of modified nitrocellulose, nitroamine, and composite material comprising ammonium perchlorate and a rubberized binder.

21. A method of sand control in a subterranean formation comprising the steps of:
   selecting an interval along a well bore;
   placing a resin slurry comprising an acid curable resin, filler, and degradable material into the selected interval; and
   activating the acid curable resin using an activator wherein the activation causes the acid curable resin to substantially cure and aids in degrading the degradable material.

22. The method of claim 21 wherein the acid curable resin in the resin slurry is selected from the group consisting of furan-based resins, phenolic-based resins, phenol/phenol formaldehyde/furfuryl alcohol resins, and combinations thereof.

23. The method of claim 22 wherein the furan-based resin is selected from the group consisting of furfuryl alcohol resins, mixtures of furfuryl alcohol resins and aldehydes, and mixtures of furan resins and phenolic resins.

24. The method of claim 23 wherein the furan-based resin further comprises a solvent wherein the solvent is 2-butoxy ethanol, butyl lactate, butyl acetate, tetrahydrofurfuryl methacrylate, tetrahydrofurfuryl acrylate, an ester of oxalic acid, an ester of maleic acid, an ester of succinic acid, furfuryl acetate, or combinations thereof.

25. The method of claim 22 wherein the phenolic-based resin is selected from the group consisting of terpolymers of phenol, phenolic formaldehyde resins, and mixtures of phenolic and furan resins.

26. The method of claim 25 wherein the phenolic-based resin further comprises a solvent wherein the solvent is butyl acetate, butyl lactate, furfuryl acetate, 2-butoxy ethanol, or combinations thereof.

27. The method of claim 22 wherein the phenol/phenol formaldehyde/furfuryl alcohol resin comprises from about 5% to about 30% phenol, from about 40% to about 70% phenol formaldehyde, and from about 10% to about 40% furfuryl alcohol.

28. The method of claim 21 wherein the resin slurry further comprises a silane coupling agent.

29. The method of claim 28 wherein the silane coupling agent is selected from the group consisting of N-2-(aminoethyl)-3-aminopropyltrimethoxysilane, 3-glycidoxypropyltrimethoxysilane, and n-beta-(aminoethyl)-gamma-aminopropyl trimethoxysilane.

30. The method of claim 28 wherein the silane coupling agent is present in the resin slurry in an amount ranging from about 0.1% to about 3% by weight of the resin in the resin slurry.

31. The method of claim 21 wherein the resin slurry further comprises a surfactant.

32. The method of claim 31 wherein the surfactant is present in the resin slurry in an amount ranging from about 2% to about 15% by weight of the resin in the resin slurry.

33. The method of claim 21 wherein the acid curable resin is present in the resin slurry in an amount ranging from about 3% to about 70% by weight of the resin slurry.

34. The method of claim 21 wherein the filler in the resin slurry is selected from the group consisting of sand, proppant, gravel, ground walnut hulls polymer particles, microspheres, glass particles, ceramic particles, silica particles, carbon black powder, rubber particles, and combinations thereof.

35. The method of claim 21 wherein the filler is present in the resin slurry in an amount ranging from about 5% to about 50% by weight of the resin slurry.

36. The method of claim 21 wherein the degradable material in the resin slurry is selected from the group consisting of degradable polymers, dehydrated salts, and combinations thereof.

37. The method of claim 21 wherein the degradable material is selected from the group consisting of substantially water insoluble esters, ortho esters, poly(orthoesters), aliphatic polyesters, lactides, poly(lactides), glycolides, poly(glycolides), poly($\epsilon$-caprolactones), poly(hydroxybutyrates), anhydrides, poly(anhydrides), poly(amino acids), polysaccharides, dextran, cellulose, chitins, chitosans, proteins, aliphatic polycarbonates, poly(ethylene oxides), polyphosphazenes, particulate solid anhydrous borate materials, anhydrous sodium tetraborate, anhydrous boric acid, and combinations thereof.

38. The method of claim 21 wherein the degradable material is present in the resin slurry in an amount ranging from about 1% to about 50% by weight of the resin slurry.

39. The method of claim 21 wherein the activator comprises a gas generating charge that is comprised mainly of a slow burning and nondetonating propellant.

40. The method of claim 39 wherein the nondetonating propellant is selected from the group consisting of modified nitrocellulose, nitroamine, composite materials comprising ammonium perchlorate and a rubberized binder.

41. A method of producing hydrocarbons through a permeable resinous mass comprising the steps of:
   selecting an interval along a well bore in a producing subterranean formation;
   placing a resin slurry comprising an acid curable resin, filler, and degradable material into the selected interval;
   activating the acid curable resin using an activator wherein the activation causes the acid curable resin to substantially cure, the degradable material to substantially degrade, and forms the permeable resinous mass; and
   producing hydrocarbons from the subterranean formation through the permeable resinous mass.

42. The method of claim 41 wherein the acid curable resin in the resin slurry is selected from the group consisting of furan-based resins, phenolic-based resins, phenol/phenol formaldehyde/furfuryl alcohol resins, and combination thereof.

43. The method of claim 42 wherein the furan-based resin is selected from the group consisting of furfuryl alcohol resins, mixtures of furfuryl alcohol resins and aldehydes, and mixtures of furan resins and phenolic resins.

44. The method of claim 43 wherein the furan-based resin further comprises a solvent wherein the solvent is 2-butoxy ethanol, butyl lactate, butyl acetate, tetrahydrofurfuryl methacrylate, tetrahydrofurfuryl acrylate, an ester of oxalic acid, an ester of maleic acid, an ester of succinic acid, furfuryl acetate, or combinations thereof.

45. The method of claim 44 wherein the phenolic-based resin is selected from the group consisting of terpolymers of phenol, phenolic formaldehyde resins, and mixtures of phenolic and furan resins.

46. The method of claim 45 wherein the phenolic-based resin further comprises a solvent wherein the solvent is butyl acetate, butyl lactate, furfuryl acetate, 2-butoxy ethanol, or combinations thereof.

47. The method of claim 42 wherein the phenol/phenol formaldehyde/furfuryl alcohol resin comprises from about 5% to about 30% phenol, from about 40% to about 70% phenol formaldehyde, and from about 10% to about 40% furfuryl alcohol.

48. The method of claim 41 wherein the resin slurry further comprises a silane coupling agent.

49. The method of claim 48 wherein the silane coupling agent is selected from the group consisting of N-2-(aminoethyl)-3-aminopropyltrimethoxysilane, 3-glycidoxypropyltrimethoxysilane, and n-beta-(aminoethyl)-gamma-aminopropyl trimethoxysilane.

50. The method of claim 48 wherein the silane coupling agent is present in the resin slurry in an amount ranging from about 0.1% to about 3% by weight of the resin in the resin slurry.

51. The method of claim 41 wherein the resin slurry further comprises a surfactant.

52. The method of claim 51 wherein the surfactant is present in the resin slurry in an amount ranging from about 2% to about 15% by weight of the resin in the resin slurry.

53. The method of claim 41 wherein the acid curable resin is present in the resin slurry in an amount ranging from about 3% to about 70% by weight of the resin slurry.

54. The method of claim 41 wherein the filler in the resin slurry is selected from the group consisting of sand, proppant, gravel, ground walnut hulls, polymer particles, microspheres, glass particles, ceramic particles, silica particles, carbon black powder, rubber particles, and combinations thereof.

55. The method of claim 41 wherein the filler is present in the resin slurry in an amount ranging from about 5% to about 50% by weight of the resin slurry.

56. The method of claim 41 wherein the degradable material in the resin slurry is selected from the group consisting of degradable polymers, dehydrated salts, and combinations thereof.

57. The method of claim 41 wherein the degradable material is selected from the group consisting of substantially water insoluble esters, ortho esters, poly(orthoesters), aliphatic polyesters, lactides, poly(lactides), glycolides, poly (glycolides), poly($\epsilon$-caprolactones), poly(hydroxybutyrates), anhydrides, poly(anhydrides), poly(amino acids), polysaccharides, dextran, cellulose, chitins, chitosans, proteins, aliphatic polycarbonates, poly(ethylene oxides), polyphosphazenes, particulate solid anhydrous borate materials, anhydrous sodium tetraborate, anhydrous boric acid, and combinations thereof.

58. The method of claim 41 wherein the degradable material is present in the resin slurry in an amount ranging from about 1% to about 50% by weight of the resin slurry.

59. The method of claim 41 wherein the activator comprises a gas generating charge that is comprised mainly of a slow burning and nondetonating propellant.

60. The method of claim 59 wherein the nondetonating propellant is selected from the group consisting of modified nitrocellulose, nitroamine, and composite materials comprising ammonium perchlorate and a rubberized binder.

* * * * *